(12) United States Patent  
Walker (10) Patent No.: US 8,601,816 B2  
(45) Date of Patent: Dec. 10, 2013

(54) CLOSED-CYCLE MHD-FARADAY GENERATION OF ELECTRIC POWER USING STEAM AS THE GASEOUS MEDIUM

(75) Inventor: David J. Walker, Wadsworth, OH (US)

(73) Assignee: Babcock & Wilcox Power Generation Group, Inc., Barberton, OH (US)

( * ) Notice: Subject to any disclaimer, the term of this patent is extended or adjusted under 35 U.S.C. 154(b) by 0 days.

(21) Appl. No.: 11/780,130

(22) Filed: Jul. 19, 2007

(65) Prior Publication Data

US 2009/0021010 A1    Jan. 22, 2009

(51) Int. Cl.
*F01K 25/00* (2006.01)
*F01K 13/00* (2006.01)
*G21D 7/02* (2006.01)
*H02K 44/00* (2006.01)

(52) U.S. Cl.
USPC .................................. 60/671; 60/645; 310/11

(58) Field of Classification Search
USPC ........................ 60/670, 671, 715, 649; 310/11
See application file for complete search history.

(56) References Cited

U.S. PATENT DOCUMENTS

| | | | |
|---|---|---|---|
| 3,140,411 A * | 7/1964 | Oickle, Jr. et al. ............ 376/317 |
| 3,392,292 A * | 7/1968 | Feinstein ........................ 310/11 |
| 3,426,222 A * | 2/1969 | Robbins .......................... 310/11 |
| 3,430,081 A * | 2/1969 | Zauderer ......................... 310/11 |
| 3,980,907 A * | 9/1976 | Nakamura ...................... 310/11 |
| 4,516,043 A * | 5/1985 | Vigil et al. ...................... 310/11 |
| 4,523,113 A * | 6/1985 | Kallman ......................... 310/11 |
| 5,086,234 A * | 2/1992 | Shiota et al. ................... 290/52 |
| 7,131,259 B2 * | 11/2006 | Rollins, III ............... 60/39.182 |
| 7,304,396 B2 * | 12/2007 | Haje et al. ..................... 290/1 R |
| 7,494,532 B2 * | 2/2009 | Azukizawa et al. ............. 96/27 |
| 2006/0091731 A1 * | 5/2006 | Haje et al. ....................... 310/11 |

* cited by examiner

*Primary Examiner* — Christopher Jetton
(74) *Attorney, Agent, or Firm* — Eric Marich (57) ABSTRACT

A closed-cycle system and method of electrical power generation uses steam to transport charge carriers through an MHD generator. Water droplets, fine particles or mixtures thereof are used as the charge carriers. The fine particles are sufficiently small to allow the particles to pass through pumps and other equipment in the flow path with little or no damage, thereby eliminating the need to remove and re-inject a seed material, or treat it prior to discharge to the environment. The high operating temperatures of prior art MHD generators are avoided, thereby allowing more economical and readily available materials to be used. The system and method also allows the MHD generator to be used as the bottoming cycle in a single-loop power generation system, with a conventional steam turbine-generator used as the topping cycle, resulting in an increased heat rate with reduced emissions of greenhouse gases and other pollutants, and with reduced heat rejection to the environment per unit of electricity produced.

69 Claims, 4 Drawing Sheets

MHD Topping Cycle

Steam Bottoming Cycle

CLOSED-CYCLE MHD-FARADAY GENERATION OF ELECTRIC POWER USING STEAM AS THE GASEOUS MEDIUM

FIELD AND BACKGROUND OF THE INVENTION

The present invention relates generally to the generation of electrical power by a magneto-hydrodynamic (MHD) generator, and more particularly to closed-cycle MHD generators.

Power generation by means of fossil fired steam generators or boilers, which drive a steam turbine-generator, is well established. Power generation by means of magneto-hydrodynamics (MHD), or magneto-fluid-dynamics (MFD), has been used in a variety of small-scale applications.

Large-scale applications using MHD were attempted in the power generation field in the latter half of the 20$^{th}$ century. These applications involved trying to generate electricity using hot flue gas upstream of a fossil fired generator. The goal was to co-generate electricity directly, that is, without an intervening turbine generator, as an addition to the main quantity of electricity generated through the conventional steam turbine-generator.

Figure 1:
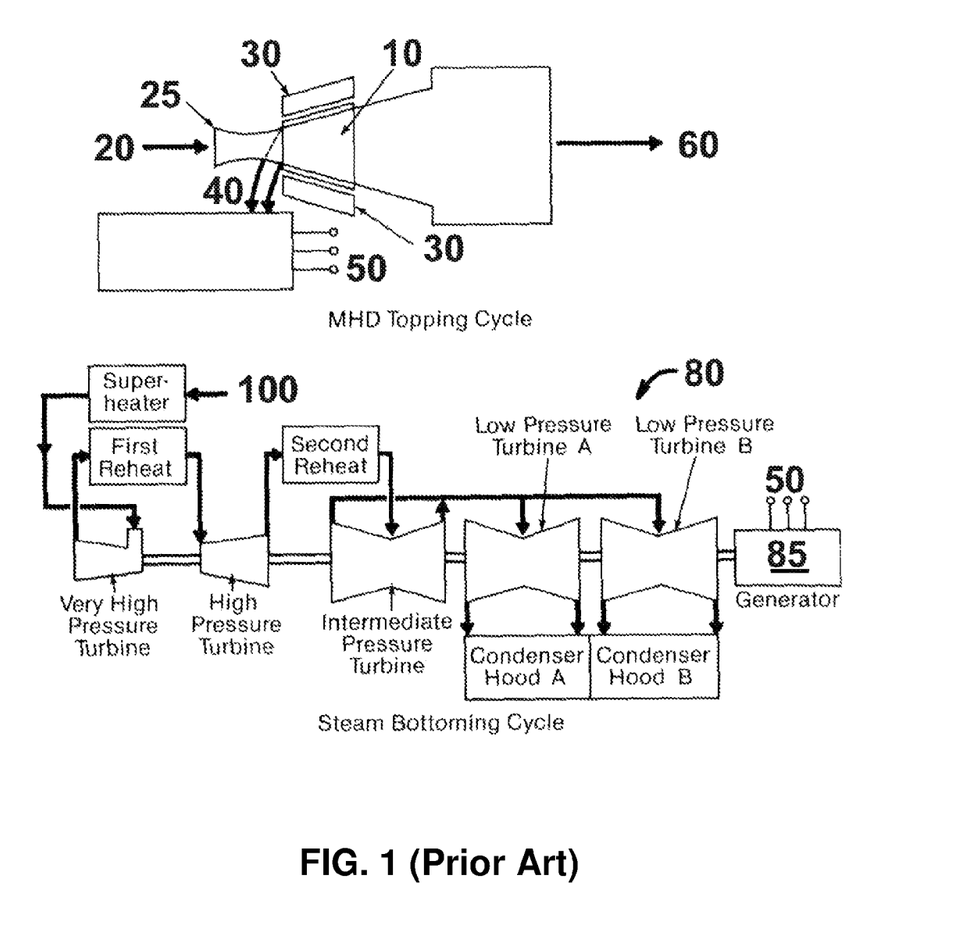
FIG. 1 is a schematic diagram of a known MHD power plant system.

As shown in FIG. 1, magneto-hydrodynamic or MHD electric power generation occurs when hot, partially ionized combustion gas (plasma) 20 is expanded through a magnetic field. Electrodes in the collection channel 10 pick up energy from the moving gas. The electrically-conducting gas 20 passing through a magnetic field produced by magnet 30 creates a voltage potential similar to moving an electrical wire through a magnetic field. This creates a direct current 40. The direct current is conditioned and inverted to alternating current 50 feeding conventional electric power distribution systems.

In traditional MHD power generation, the hot gas 20 is produced in a coal combustor at temperature approaching 5000 F. (2760 C.). Even at high gas temperatures it was generally believed to be necessary to increase the available gas ionization by seeding the gas with an easily ionized material. Potassium compounds were preferred. The spent seed compounds were treated and recycled for economic and environmental reasons.

The MHD system includes a high temperature coal combustor with seeding capability producing the high temperature plasma 20, which enters a magnetic field through a nozzle 25. The gases expand through the magnetic field and then enter a high temperature ceramic air heater 60. The high gas temperature required for the plasma 20 makes it necessary for the combustion air/oxygen to have a temperature of about 3000 F. (1649 C.). Downstream of the air heater 60, the cooled gases enter the steam bottoming portion of the plant cycle. The bottoming portion of the plant consists of a conventional steam generator capable of generating steam 100, which powers a steam turbine-generator 80.

Studies based on the cycle shown in FIG. 1 led to an advanced design 1000 MW output MHD steam plant. Advanced concepts used in this study included 3100 F. (1704 C.) direct-fired ceramic air preheaters, a high efficiency motor driven axial compressor, high pressure (1.467 kPa) combustion with low heat loss, superconducting magnets 30, low heat loss ceramic channel electrodes, high electrical stress design, moderate pressure [800 psi (1.4 Mpa)] channel cooling 10 and a high performance diffuser. The advanced concept MHD bottoming cycle resulted in a plant having a net efficiency of 60.4% on a higher heating value basis, compared to conventional cycle efficiency of around 40%. The combustion air preheat for the MHD combustor was projected to be 3100 F. (1704 C.) with a combustor pressure of 210 psi (14.5 bar). The bottoming cycle main steam throttle pressure was 5000 psi (345 bar); superheater outlet steam temperature was 1200 F. (649 C.); and reheat outlet temperatures were 1050 to 1150 F. (566 to 621 C.). The environmental impact of this cycle was projected to be significantly better in the areas of $SO_2$, $NO_x$, $CO_2$, particulates, solid wastes, cooling heat rejection and total water consumption than a conventional steam plant producing the same amount of electricity.

As described above, the application of MHD for utility scale electric power generation uses MHD as a topping cycle combined with a steam bottoming cycle. This process employs a high temperature gas seeded with particles (normally potassium particles), which at high temperatures would be ionized, creating a cloud of charged particles in the hot gas. The high temperature gases were required only to keep the particles ionized and therefore electrically charged, thereby forming a plasma or cloud of charged particles. A magnetic field was to be applied across the flue carrying the ionized particles, with electric current to be taken off using contacts or terminals in contact with the gas flow normal to the direction of the magnetic field imposed. This process required operation at high gas temperatures to ensure the particles in the gases stayed ionized. In addition, due to the cost of the seed particles, highly efficient removal of the seed particles from the flue gases for reuse in the MHD process was required to make the overall process feasible economically and environmentally. This proved economically impossible to achieve to the degree necessary. The MHD topping cycle combined with a steam bottoming cycle was never commercially successful and development stopped.

More recently, others in Japan have studied development of closed-loop or closed-cycle MHD, where the gases pass through a gas turbine-generator located downstream of the MHD generator. Such a system is described in U.S. Pat. No. 5,086,234, which discloses a heat source for heating a rare gas (i.e. noble gas) and means, disposed in the heater, for adding alkali metal vapor as a seed agent to improve the conductivity of the gas. The heated rare gas and seed agent is first introduced into an MHD generator, and then discharged into a heat exchanger, where the seed agent is removed from the gas. The rare gas, with the seed agent removed, is then compressed and used to drive a gas turbine-generator unit. With such seed agent recovery, the rare gas entering the gas turbine-generator unit is substantially free from the seed agent.

U.S. Pat. No. 4,516,043 discloses an open-cycle MHD system wherein carbon particles serve as charge carriers, and which are transported by combustion gases in the MHD process. A main combustor produces a flow of hot gases containing microscopic carbon particles, the particles preferably having a mean diameter between about $0.02 \times 10^{-6}$ m to $0.04 \times 10^{-6}$ m (20-40 nanometers). The flow of hot gas, together with the entrained carbon particles, is directed into an electrostatic charging device that positively charges the carbon particles. The charging device may be essentially similar to the electrostatic precipitators used to remove fly ash and other particulates from stack gases. The combustion gases and charged charge carriers are directed into an MHD generator, and are then discharged to an afterburner where the carbon particles are removed from the flow by combustion. The MHD generator is operated at temperatures between about 1500 degrees C. and 2500 degrees C. The heat in the combustion gases, including heat produced from combustion of the carbon particles, is used to generate steam to run a steam turbine-generator in a steam bottoming cycle. The goal of the above arrangement is to provide a less costly MHD topping cycle that does not require seeding with alkali metals.

The MHD systems described above use high temperature combustion gas or noble gases as the working fluid to transport charge carriers through the MHD generator. The MHD generator, when combined with a steam or gas turbine to improve cycle efficiency, is located upstream of the turbine-generator as part of an MHD topping cycle. The seed material is either removed from the working fluid and then returned to the working fluid in closed-cycle systems, or is discharged from the system in open-cycle systems.

SUMMARY OF THE INVENTION

The present invention is drawn to a closed-cycle system and method of electrical power generation in which steam is used as the working fluid to transport charge carriers through an MHD generator. Water droplets, fine particles or mixtures thereof are used as the charge carriers. The fine particles, where used, are sufficiently small to allow the particles to pass through pumps and other equipment in the flow path with little or no damage. This advantageously eliminates the need to remove and re-inject a seed material, or treat it prior to discharge to the environment. The invention avoids the high operating temperatures of prior art MHD generators, thereby allowing more economical and readily available materials to be used. The system and method also allows the MHD generator to be used as the bottoming cycle in a single-loop power generation system, with a conventional steam turbine-generator used as the topping cycle.

These advantages and others, enable electricity to be generated with an increased heat rate (KWH/BTU fuel input) resulting in reduced emissions of greenhouse gases, particulates and other pollutants, and with reduced heat rejection to the environment (each on a per KWH basis of electricity generated from fossil fired steam generation), and at potentially lower cost.

Accordingly, one aspect of the present invention is drawn to a system for generating electricity. The system includes a boiler for discharging a flowing mixture of steam and charge carriers. Charging means, in fluid communication with the boiler, charges the charge carriers, and the charged charge carriers are transported by the steam to a magneto-hydrodynamic generator. The magneto-hydrodynamic generator receives the steam and charged charge carriers from the charging means, and produces electricity therefrom. The system includes means for returning the steam and charge carriers from the magneto-hydrodynamic generator to the boiler without removing the charge carriers.

Another aspect of the present invention is drawn to a system for generating electricity having a boiler for discharging a flowing mixture of steam and charge carriers, and wherein the charge carriers include particles having a mean diameter from about 100 to about 5000 nanometers. The system further has charging means, in fluid communication with the boiler, for charging the charge carriers. A magneto-hydrodynamic generator receives the steam and charged charge carriers from the charging means, and produces electricity therefrom. A steam turbine-generator, in fluid communication with and located downstream of the boiler and upstream of the MHD generator, produces additional electricity. The system also includes means for returning the steam and charge carriers to the boiler from the steam turbine-generator without removing the charge carriers.

Yet another aspect of the present invention is drawn to a method of generating electricity. The method includes the steps of discharging a flowing stream of steam and charge carriers from a boiler, charging the charge carriers, directing the flowing steam and charged charge carriers through an MHD generator, thereby producing an electrical current, and then returning the steam and charge carriers to the boiler without removing the charge carriers.

The various features of novelty which characterize the invention are pointed out with particularity in the claims annexed to and forming part of this disclosure. For a better understanding of the present invention, and the operating advantages attained by its use, reference is made to the accompanying drawings and descriptive matter, forming a part of this disclosure, in which a preferred embodiment of the invention is illustrated.

BRIEF DESCRIPTION OF THE DRAWINGS

In the accompanying drawings, forming a part of this specification, and in which like reference numerals designate the same or functionally similar elements throughout the several drawings.

DESCRIPTION OF THE PREFERRED EMBODIMENTS

The present invention employs a process that might be termed the MHD-Faraday principle to generate electricity.

The high temperatures normally associated with MHD electrical power generation in the past have been considered necessary to ionize molecules, such as the potassium seed of an MHD topping cycle, to enable the MHD process to work. (See for example U.S. Pat. No. 4,239,996 assigned to the assignee of the present invention, which is incorporated herein by reference as though fully set forth.) However, the electrical phenomena used in MHD are the same as used in motors and generators at ambient temperatures. There the 'charged particles' are electrons in the wires.

The process of MHD electric power generation is an application of the Faraday principle, or law of electromagnetic induction. The Faraday principle says that a changing electromagnetic field induces an electromotive force (emf) in a conductor; that is, an induced electric field acts on the free charges, causing an induced current. However, even in the absence of a conductor, a changing magnetic field produces an electric field. It is known that the Faraday principle does not require extremely hot temperatures to function. This principle is the same as used in common motors and generators.

It is possible to create a cloud of charged particles in a gas by applying a high electrical potential, low electrical current, across a gas having particles that will hold a charge. For instance, a static electrical charge can be imposed on certain materials by using a high electrical potential to create a strong electrical field across the material. The present invention produces 'charged particles' by subjecting water droplets or fine particles in steam to a high potential (voltage), very low current, electrical field. This is similar to the process used in an electrostatic precipitator at temperatures of less than approximately 300 F., where the flue gas is first ionized/charged and that charge is transferred to fly ash particles, which then migrate to the nearby collecting panels. Electrostatic precipitators create the required field between two electrodes, with a high potential direct current source (around 55,000 to 75,000 volts). One electrode ionizes the gas and generates the charge carriers, which attach themselves to floating particles and charge them. The other electrode is grounded and attracts the charged particles, which precipitate out of the gas. For additional details of the design and operation of electrostatic precipitators, the reader is referred to pages 33-2 to 33-8 of *Steam/its Generation and Use,* 41 st Edition, Kitto and Stultz, Eds., © 2005 The Babcock & Wilcox Company, Barberton, Ohio, U.S.A., the text of which is hereby incorporated by reference as though fully set forth herein.

To prevent 'collection' of the particles, the distance between terminals providing the high voltage electrical field may need to be limited. Alternatively, the high voltage electrical field applied may be alternating current (A.C.) rather than direct current (D.C.), thereby limiting the time for particles to migrate to any collecting place.

Figure 2:
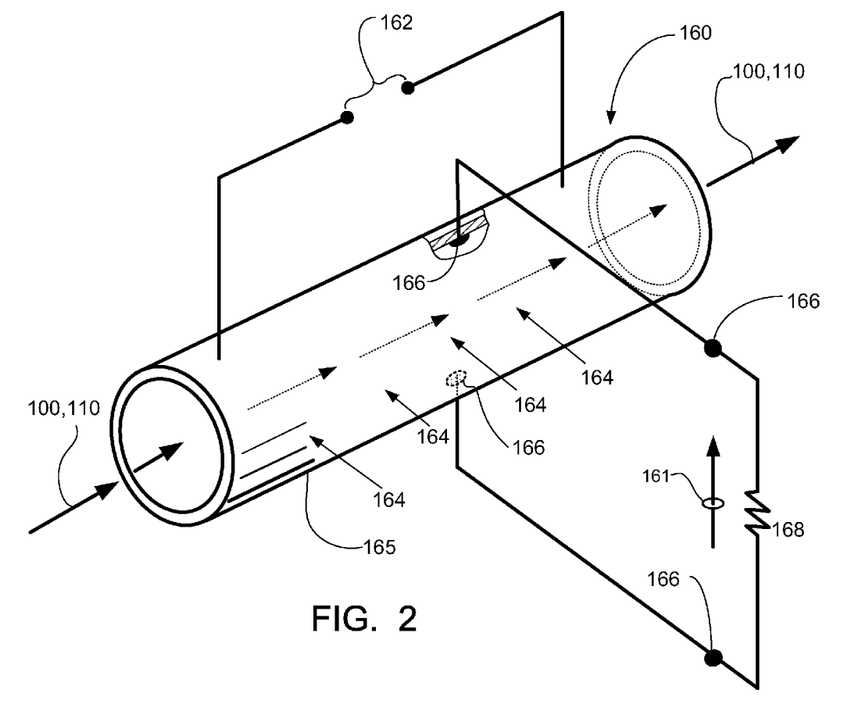
FIG. 2 is a schematic diagram of an MHD-Faraday electric power generation element according to the present invention.

Referring now to FIG. 2, MHD-Faraday electric generation elements, generally designated as 160, are envisioned to require a flow channel 165 ranging from a pipe a few inches in diameter up to a large header size, around 24" in diameter. The length required for each electric generation element 160 would depend on the specific electrical phenomena, the space required to apply the magnetic field to each element (or multiple elements), as well as the velocity of the charged 'particles' in the steam (working fluid). Steam 100 and charge carriers 110 enter the electric generation elements 160 comprised of a charging system and an MHD generator, where a high voltage electrode 162 applies a charge to the charge carriers 110. Charged charge carriers 110 are transported by steam 100 past applied magnetic field 164, thereby generating an electrical potential difference across electrical output terminals 166 and passing an electrical current 161 across load 168. It is expected that the electrical current 161 would be a direct current. If that is the case, and an alternating current is required, persons skilled in the electrical arts can provide equipment necessary to produce alternating current from the supplied direct current.

Figure 4A:
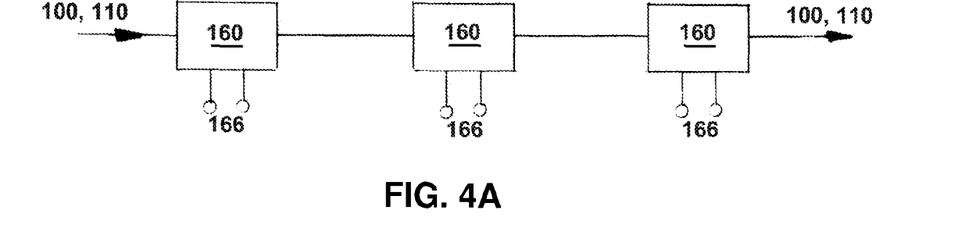
FIG. 4A is a block diagram showing arrangements of MHD-Faraday electric power generation elements in a series flow path.
Figure 4B:
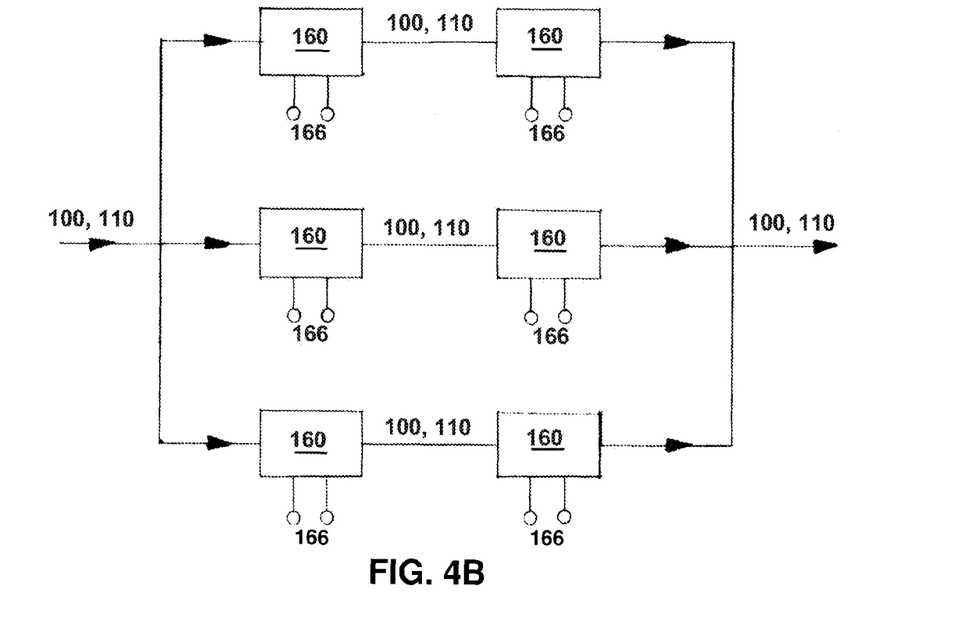
FIG. 4B is a block diagram showing arrangements of MHD-Faraday electric power generation elements in a combination of series and parallel flow paths.

By channeling the steam 100 through channels or pipes where an electrical potential can be applied to charge the charge carriers 110, and where a magnetic field 164 can be applied across the channel, electrical current can be taken off by means of electrical terminals 166. The flow could be in a single flow channel, as shown in FIG. 4A, split into multiple parallel flow channels, or split into combinations of both serial and parallel flow, as shown in FIG. 4B. The electrical terminals 166 could be wired in series or parallel, or a combination of both series and parallel, to create the desired voltage and current. For example, MHD-Faraday electric generation elements 160 could be wired in series to increase the voltage produced, while the flow path of the steam and charge carriers 110 through elements 160 could be arranged in series and/or parallel steam path(s). As another example, electric generation elements 160 could be wired in parallel to increase the electrical current produced, while the flow path through elements 160 is arranged in series and/or parallel steam path(s).

Current technology in the power generation field includes non-metallic, fiber-reinforced plastic (FRP) pipe, which is used commercially for fluids at moderate temperatures and pressures above ambient. These temperatures and pressures are adequate for turbine exhaust steam downstream of feedwater heaters flowing towards the condenser. If a non-conducting channel is required, low pressure/temperature steam in FRP piping may be a suitable alternative.

Figure 3:
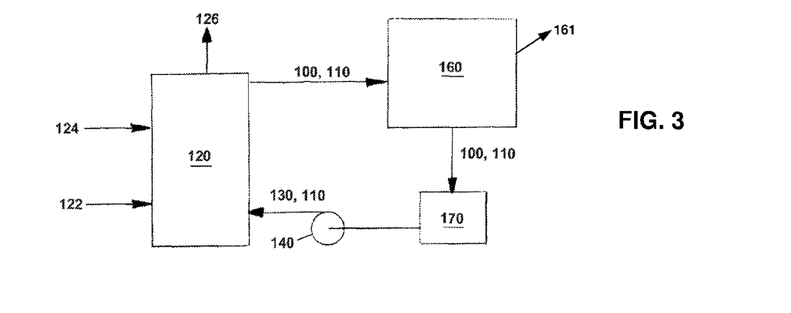
FIG. 3 is a block diagram showing an application of the MHD-Faraday electric power generation as main electricity generator.

The MHD-Faraday electric generating system and method of the present invention employs a multitude of small, charged particles to generate electricity directly as the primary generator, without a conventional turbine-generator, using steam from an otherwise conventional steam cycle to transport the charge carriers. Referring now to FIG. 3, steam 100 is produced in a boiler or steam generator 120, which uses heat produced by combustion of fuel 122 and air or oxygen 124 to boil feed water 130 as is known in the art. This is preferably accomplished with a once-through boiler such as a Struthers-Wells type boiler or a variation thereof, or possibly a drum type boiler, as is discussed in greater detail below. Flue gas 126 produced by the combustion of fuel 122 and air 124 is discharged to a stack (not shown).

Charge carriers 110 are produced within or initially introduced into steam 100, and are transported by steam 100 through MHD electric generating element 160 for producing electric current 161. MHD electric generating element 160 comprises a charging system, and an MHD-Faraday generator as is known in the art. Charged charge carriers 110 are produced by the charging system, and are transported by the steam 100 past the magnetic field of the MHD-Faraday generator, thereby generating electricity 161 which is taken off from terminals 166 appropriately located within MHD electric generating element 160.

The steam 100 and charge carriers 110 are discharged from the electric generation element 160 to a condenser 170, where the steam is condensed into water, and are returned to steam generator 120 as feed water 130 along with charge carriers 110. No advanced heat exchangers or compressors are needed to implement the invention.

It is possible that droplets in wet steam might serve as charge carriers 110 with no introduced particles being required, i.e. the use of water and steam alone as the charged gas in the MHD-Faraday process, with saturated water droplets acting as the charged 'particles' needed for the process.

Alternatively, only introduced particles could be used as the charge carriers 110, with dry steam used only as a transport medium for the charge carriers. Candidate particles that could be introduced as the charge carriers include carbon, various forms of carbon compounds, iron (Fe), various iron compounds, alkali metals, or alkali metal salts. A combination of charged droplets in wet steam, along with charged, introduced particles, might also be used to reduce the number of particles required in the process.

While the charge carriers 110 could be added to the steam 100 and removed before the condenser 170 for reuse, the preferred method is to use particles of a size small enough that they can travel through the feedwater pump 140, the boiler 120, superheater, steam turbine 180 (when applicable) and feedwater heaters 190 without problem. It is known that erosion and abrasion are due to several factors including particle size, mass, hardness, and angularity. As particle size decreases, erosive and abrasive potential decrease, in part due to the mass being proportional to the diameter to the $3^{rd}$ power. In the subject invention fine particles are therefore preferably used as the charge carriers 110.

When the size of particles suspended in a still gas are sufficiently small, the behavior or motion of those particles is affected physically by the thermal activity of the molecules of the gas, resulting in a random walk of the particles immersed in the gas, defined as Brownian Motion, or Brownian Movement. This effect can be seen visually with particles sizes found in smoke in air at room temperature. It is also known that particles less than a certain size will be entrained in a flowing gas, and if the particles are small enough, the particles will follow the flow streamlines of the gas even when the gas changes direction.

Scientists and engineers are currently working to develop nano-sized particles. Nanoparticles are defined as anything smaller than 100 nanometers in size. (A nanometer is one-billionth of a meter, or $1 \times 10^{-9}$ meters, thus 100 nanometers is $100 \times 10^{-9}$ meters, 1 micron is 1000 nanometers, and 100 nanometers is 0.1 microns.) Nanoparticles are significantly smaller than the size particles required for Brownian motion, or for particles to follow the flow streamlines of a gas.

One of the materials being closely studied, and of which nano-sized particles have been created, is carbon. Particles of certain materials, including carbon, will hold an electrical charge. (See for example U.S. Pat. No. 4,516,043, "Method & Apparatus for generating electric energy from a heated gas containing carbon particles," which is incorporated herein by reference as though fully set forth).

Nanoparticles would likely be sufficiently small enough to avoid any wear on metallic surfaces at the macro-scale due to the extremely small size and mass of the particles relative to the surface roughness of the metal. Thus it is probable that water laden with nano-sized particles can be moved through a conventional water pump, for example, without causing undue wear. The small size of the particles should also prevent further degradation of the size of the particles when circulated through the system and the pump.

The mass of particles depends on the $3^{rd}$ power of their diameter. The mass of the particles therefore decreases very rapidly with decrease in particle size, so it is probable that abrasion and erosion, even at high velocities such as in a steam turbine, would essentially cease with particles considerably larger than the nano-range sizes. Particles in an intermediate size range, i.e. larger than nano-particles (greater the 100 nanometers), but small enough to avoid abrasion and erosion problems, are therefore most preferable due to environmental safety considerations. Data on erosion of gas turbines indicate that if ash particles are less than 5 microns (5000 nanometers) the erosion rate is effectively zero.

The particles employed in the present invention, when used, are small enough to avoid abrasion, erosion or other damage to equipment, are small enough to follow the streamlines of the gas (steam), and are preferably no smaller than necessary, to avoid environmental problems which may result from use of nanoparticles.

Unlike prior art seed agents and charge carriers, the charge carriers of the present invention need not be either removed and then re-injected back into the system, or discharged to the environment.

Figure 5:
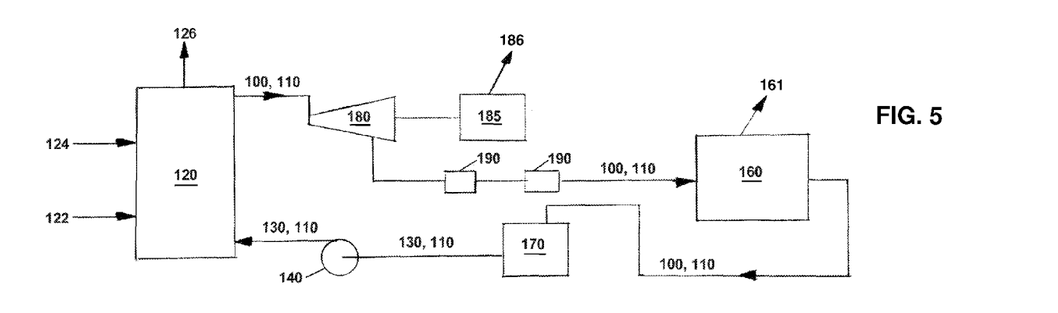
FIG. 5 is a schematic diagram of an MHD-Faraday bottoming cycle according to the present invention, with a conventional steam topping cycle.

Referring now to FIG. 5, the subject invention may also be used as a bottoming cycle with a conventional steam-turbine topping cycle. The MHD-Faraday bottoming cycle employs a multitude of small, charged particles, in the steam of a conventional, closed single-loop steam topping cycle, to generate electricity directly, in addition to the electricity from a steam turbine-generator, with little or no additional fuel required compared to the same conventional cycle.

Steam 100 is produced in a boiler or steam generator 120, which uses heat produced by combustion of fuel 122 and air or oxygen 124 to boil feed water 130. Flue gas 126 produced by the combustion of fuel 122 and air or oxygen 124 is discharged to a stack (not shown).

Steam generator 120 is preferably a once through steam generator, as is known in the art. Steam generators of the once through variety range from supercritical utility units with high purity steam generated, to relatively low pressure units which generate low quality or wet steam (e.g., Struthers-Wells type once through steam generators). In both types of once through steam generators the water and steam travel together, in contrast to the drum type boiler, which has a recirculation of water and a water level in the steam drum. By introducing a significant quantity of nano-size particles, or preferably particles of an intermediate size, into the water of a once through steam generator it should be possible to circulate those particles integrally with the water and water-steam 'mixture' without separation of the particles from the fluid.

Drum type boilers, on the other hand, undergo evaporative separation of steam and water enhanced by steam separation drum internals. With nano-size particles, or particles of an intermediate size, the particles might remain in the water, rather than breaking free from the surface of the water level in the drum to follow the steam. If the particles are found to break free and follow the steam, the invention could also be applicable to drum type boilers.

Steam 100 and charge carriers 110 pass through steam turbine 180 which drives generator 185, thereby producing electricity 186. Steam 100 and charge carriers 110 are then directed through feed water heaters 190 upstream of MHD electric generating element 160, and then into MHD electric generating element 160. Referring to the arrangement of FIG. 3, the subject invention can be used as the primary method of electrical generation whereby steam or steam/water mixture is directed from the steam generator directly to the MHD electric generating element 160, optionally utilizing the steam for heating prior to entering the MHD electric generating element 160. Similar to the arrangement of FIG. 3, charged charge carriers 110 are produced by a charging system and are carried by the steam 100 past the magnetic field of an MHD-Faraday electrical generator in MHD electric generation element 160. The steam 100 and charge carriers 110 are discharged from the electric generation element 160 to a condenser 170 where the steam is condensed into water, and returned to steam generator 120 as feed water 130 along with charge carriers 110.

In contrast with prior art systems, MHD electric generation element 160 functions as a bottoming cycle, rather than as a topping cycle. Steam turbine 180 is located upstream, rather than downstream of the MHD electric generation element 160.

While specific embodiments and/or details of the invention have been shown and described above to illustrate the application of the principles of the invention, it is understood that this invention may be embodied as more fully described in the claims, or as otherwise known by those skilled in the art (including any and all equivalents), without departing from such principles. For example, the system and method described above could be retrofitted to existing fossil fired power plants. While the invention could be used with any steam generating method, and any closed-cycle thermodynamic cycle, fossil fired generators and waste heat boilers are considered preferable applications.

I claim:

1. An electric power plant of a closed cycle structure, comprising a boiler for discharging a mixture of flowing steam and selectively sized charge carriers, a magneto-hydro-dynamic (MHD) generator operatively connected to the boiler for receiving the steam and charge carriers, charging means in fluid communication with the charge carriers for charging the charge carriers to produce an electric current using Faraday's Principle as they pass through the MHD generator, a condenser operatively connected to the MHD generator for condensing the steam to feedwater, a pump operatively connected with the condenser and the boiler to supply the feedwater and charge carriers to the boiler without removing the charge carriers since they are selectively sized for substantially abrasion-free and erosion-free passage through the closed cycle structure, wherein the combination of the flowing steam and charge carriers generates electricity directly as the primary generator without the use of a conventional turbine-generator.

2. The electric power plant of claim 1, wherein the charge carriers are particles sized with a mean diameter less than 5000 nanometers.

3. The electric power plant of claim 1, wherein the charge carriers are particles sized with a mean diameter greater than 100 nanometers.

4. The electric power plant of claim 1, wherein the charge carriers are selected from the group consisting of: steam conveyed water droplets, fine particles and mixtures thereof.

5. The electric power plant of claim 1, wherein the charge carriers are steam conveyed water droplets.

6. The electric power plant of claim 1, wherein the charge carriers are non-carbonaceous particles.

7. The electric power plant of claim 1, wherein the charge carriers are carbonaceous particles.

8. The electric power plant of claim 1, wherein the charge carriers are charged by subjecting them to a high voltage, low current electrical field.

9. The electric power plant of claim 8, wherein the high voltage electrical field is applied using at least one of a direct current and an alternating current.

10. The electric power plant of claim 8, an electric current is produced as the charged charge carriers are transported past a magnetic field applied in the MHD generator.

11. The electric power plant of claim 1, wherein the power plant produces an alternating current.

12. The electric power plant of claim 1, wherein the MHD generator produces a direct current.

13. The electric power plant of claim 1, wherein the MHD generator includes a least one flow channel for passage therethrough of the charge carriers, a high voltage using a low current is applied along the channel to charge the charge carriers, a magnetic field is applied across the channel, and an electric current is generated as the charged charge carriers pass the magnetic field.

14. The electric power plant of claim 13, including a plurality of flow channels connected in series.

15. The electric power plant of claim 13, including a plurality of flow channels connected parallel to one another.

16. The electric power plant of claim 1, wherein the boiler is a once-through boiler.

17. The electric power plant of claim 1, wherein the boiler is a drum boiler.

18. An electric power plant of a closed cycle structure, comprising a boiler for discharging a mixture of flowing steam and selectively sized charge carriers, a magneto-hydrodynamic (MHD) generator operatively connected to the boiler for receiving the steam and charge carriers, charging means in fluid communication with the charge carriers for charging the charge carriers to produce an electric current using Faraday's Principle as they pass through the MHD generator, a condenser operatively connected to the MHD generator for condensing the steam to feedwater, a pump operatively connected with the condenser and the boiler to supply the feedwater and charge carriers to the boiler without removing the charge carriers since they are selectively sized for substantially abrasion-free and erosion-free passage through the closed cycle structure, wherein the combination of the flowing steam and charge carriers generates electricity directly as the primary generator without the use of a conventional turbine-generator, wherein the closed cycle structure includes a steam turbine-generator as a topping cycle for producing additional electricity, and wherein the MHD generator functions as a bottoming cycle, the steam turbine being interposed between and operatively connected to the boiler and the MHD generator.

19. The electric power plant of claim 18, including at least one feedwater heater located between the steam turbine and the MHD generator.

20. The electric power plant of claim 18, wherein the charge carriers are particles sized with a mean diameter less than 5000 nanometers.

21. The electric power plant of claim 18, wherein the charge carriers are particles sized with a mean diameter greater than 100 nanometers.

22. The electric power plant of claim 18, wherein the charge carriers are selected from the group consisting of: steam conveyed water droplets, fine particles and mixtures thereof.

23. The electric power plant of claim 18, wherein the charge carriers are steam conveyed water droplets.

24. The electric power plant of claim 18, wherein the charge carriers are non-carbonaceous particles.

25. The electric power plant of claim 18, wherein the charge carriers are carbonaceous particles.

26. The electric power plant of claim 18, wherein the charge carriers are charged by subjecting them to a high voltage, low current electrical field.

27. The electric power plant of claim 26, wherein the high voltage electrical field is applied using at least one of a direct current and an alternating current.

28. The electric power plant of claim 26, an electric current is produced as the charged charge carriers are transported past a magnetic field applied in the MHD generator.

29. The electric power plant of claim 18, wherein the power plant produces an alternating current.

30. The electric power plant of claim 18, wherein the MHD generator produces a direct current.

31. The electric power plant of claim 18, wherein the MHD generator includes a least one flow channel for passage therethrough of the charge carriers, a high voltage using a low current is applied along the channel to charge the charge carriers, a magnetic field is applied across the channel, and an electric current is generated as the charged charge carriers pass the magnetic field.

32. The electric power plant of claim 31, including a plurality of flow channels connected in series.

33. The electric power plant of claim 31, including a plurality of flow channels connected parallel to one another.

34. The electric power plant of claim 18, wherein the boiler is a once-through boiler.

35. The electric power plant of claim 18, wherein the boiler is a drum boiler.

36. A method of generating electricity in an electric power plant of a closed cycle structure, comprising:
discharging a flowing stream of steam and selectively sized charge carriers from a boiler;
charging the charge carriers;

passing the flowing steam and charged charge carriers through an MHD generator to produce an electric current using Faraday's Principle;

condensing the steam to feedwater; and returning the feedwater and charge carriers to the boiler without removing the charge carriers, wherein the combination of the flowing steam and charged charge carriers generates electricity directly as the primary generator without the use of a conventional turbine-generator.

37. The method of claim 36, wherein the charge carriers are selectively sized for substantially abrasion-free and erosion-free passage through the closed cycle structure.

38. The method of claim 36, wherein the charge carriers are particles having a mean diameter less than 5000 nanometers.

39. The method of claim 36, wherein the charge carriers are particles having a mean diameter greater than 100 nanometers.

40. The method of claim 36, further comprising the step of selecting the charge carriers from the group consisting of: water droplets, fine particles and mixtures thereof.

41. The method of claim 40, wherein the charge carriers are water droplets.

42. The method of claim 36, wherein the charge carriers are non-carbonaceous particles.

43. The method of claim 36, wherein the charge carriers are carbonaceous particles.

44. The method of claim 36, further comprising the step of applying a high voltage, low current electrical field, to charge the charge carriers.

45. The method of claim 44, further comprising the step of applying the high voltage by using at least of one of a direct current and an alternating current.

46. The method of claim 44, further comprising the step of transporting the charged charge carriers past a magnetic field applied in the MHD generator to produce the electric current.

47. The method of claim 36, further comprising the step of producing an alternating current.

48. The method of claim 36, including at least one flow channel for passage therethrough of the charge carriers, and further comprising the steps of:

applying a high voltage, low current field, along the channel to charge the charge carriers;

applying a magnetic field across the channel; and generating the electric current as the charged charge carriers pass the magnetic field.

49. The method of claim 48, including a plurality of flow channels connected in series.

50. The method of claim 48, including a plurality of flow channels connected parallel to one another.

51. The method of claim 36, wherein the boiler is a once-through boiler.

52. The method of claim 36, wherein the boiler is a drum boiler.

53. A method of generating electricity in an electric power plant of a closed cycle structure, comprising:

discharging a flowing stream of steam and selectively sized charge carriers from a boiler;

charging the charge carriers;

passing the flowing steam and charged charge carriers through an MHD generator to produce an electric current using Faraday's Principle;

condensing the steam to feedwater; and returning the feedwater and charge carriers to the boiler without removing the charge carriers, further comprising the step of generating additional electricity by directing the steam and charge carriers through a steam turbine-generator located upstream of the MHD generator, and wherein the combination of the flowing steam and charged charge carriers generates electricity directly as the primary generator without the use of a conventional turbine-generator.

54. The method of claim 53, wherein the charge carriers are selectively sized for substantially abrasion-free and erosion-free passage through the closed cycle structure.

55. The method of claim 53, wherein the charge carriers are particles having a mean diameter less than 5000 nanometers.

56. The method of claim 53, wherein the charge carriers are particles having a mean diameter greater than 100 nanometers.

57. The method of claim 53, further comprising the step of selecting the charge carriers from the group consisting of: water droplets, fine particles and mixtures thereof.

58. The method of claim 57, wherein the charge carriers are water droplets.

59. The method of claim 53, wherein the charge carriers are non-carbonaceous particles.

60. The method of claim 53, wherein the charge carriers are carbonaceous particles.

61. The method of claim 53, further comprising the step of applying a high voltage, low current electrical field, to charge the charge carriers.

62. The method of claim 61, further comprising the step of applying the high voltage by using at least of one of a direct current and an alternating current.

63. The method of claim 61, further comprising the step of transporting the charged charge carriers past a magnetic field applied in the MHD generator to produce the electric current.

64. The method of claim 53, further comprising the step of producing an alternating current.

65. The method of claim 53, including at least one flow channel for passage therethrough of the charge carriers, and further comprising the steps of:

applying a high voltage, low current field, along the channel to charge the charge carriers;

applying a magnetic field across the channel; and generating the electric current as the charged charge carriers pass the magnetic field.

66. The method of claim 65, including a plurality of flow channels connected in series.

67. The method of claim 65, including a plurality of flow channels connected parallel to one another.

68. The method of claim 53, wherein the boiler is a once-through boiler.

69. The method of claim 53, wherein the boiler is a drum boiler.

* * * * *